US008866811B2

(12) United States Patent
Okuno

(10) Patent No.: US 8,866,811 B2
(45) Date of Patent: Oct. 21, 2014

(54) IMAGE PROCESSING APPARATUS AND IMAGE PROCESSING METHOD

(75) Inventor: Yasuhiro Okuno, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 976 days.

(21) Appl. No.: 12/261,262

(22) Filed: Oct. 30, 2008

(65) Prior Publication Data
US 2009/0128564 A1 May 21, 2009

(30) Foreign Application Priority Data

Nov. 15, 2007 (JP) .................. 2007-297192

(51) Int. Cl.
G06T 7/00 (2006.01)
G06T 19/00 (2011.01)
G06T 15/20 (2011.01)

(52) U.S. Cl.
CPC ............... *G06T 15/20* (2013.01); *G06T 19/006* (2013.01)
USPC ............... 345/421; 345/633; 345/156; 345/8; 345/9; 345/626; 345/629; 345/630; 345/632; 382/154

(58) Field of Classification Search
CPC ................................. G06T 7/00; G06T 19/006
See application file for complete search history.

(56) References Cited

U.S. PATENT DOCUMENTS

| 6,084,557 | A | * | 7/2000 | Ishida et al. ...................... 345/9 |
| 6,498,606 | B1 | * | 12/2002 | Penna et al. .................. 345/422 |
| 6,972,734 | B1 | | 12/2005 | Ohshima et al. |
| 7,056,216 | B2 | | 6/2006 | Ohshima |
| 2001/0005204 | A1 | * | 6/2001 | Matsumoto et al. .......... 345/418 |
| 2003/0037449 | A1 | * | 2/2003 | Bani-Hashemi et al. ....... 33/286 |
| 2003/0227470 | A1 | * | 12/2003 | Genc et al. ..................... 345/633 |
| 2005/0073531 | A1 | * | 4/2005 | Kuroki et al. ................. 345/633 |
| 2005/0231532 | A1 | * | 10/2005 | Suzuki et al. ................. 345/633 |
| 2006/0044327 | A1 | * | 3/2006 | Okuno et al. ................. 345/626 |
| 2007/0018975 | A1 | * | 1/2007 | Chuanggui et al. ........... 345/419 |
| 2007/0035561 | A1 | * | 2/2007 | Bachelder et al. ............ 345/633 |
| 2008/0030429 | A1 | * | 2/2008 | Hailpern et al. ................... 345/8 |
| 2008/0211832 | A1 | * | 9/2008 | Kumon ......................... 345/641 |
| 2008/0266323 | A1 | * | 10/2008 | Biocca et al. ................. 345/633 |

FOREIGN PATENT DOCUMENTS

JP 2000-353248 12/2000

OTHER PUBLICATIONS

The Magic of the Z-Buffer: a Survey, Theoharis et al., 2001.*
A Stereoscopic Video See-through Augmented Reality System Based on Real-time Vision-based Registration, Kanbara et al., 2000.*

(Continued)

*Primary Examiner* — David Zarka
*Assistant Examiner* — Phong Nguyen
(74) *Attorney, Agent, or Firm* — Cowan, Liebowitz & Latman, P.C.

(57) ABSTRACT

Position and orientation information of a specific part of an observer is acquired (S403). It is determined whether or not a region of a specific part virtual object that simulates the specific part and that of another virtual object overlap each other on an image of a virtual space after the specific part virtual object is laid out based on the position and orientation information on the virtual space on which one or more virtual objects are laid out (S405). When it is determined that the regions overlap each other, an image of the virtual space on which the other virtual object and the specific part virtual object are laid out is generated; when it is determined that the regions do not overlap each other, an image of the virtual space on which only the other virtual object is laid out is generated (S409).

10 Claims, 6 Drawing Sheets

(56) References Cited

OTHER PUBLICATIONS

Affective Property Evaluation of Virtual Product Designs, Lee et al., 2004.*

Occlusion of Collaborative Augmented Environments, Fuhrmann et al., 1999.*

A Stereoscopic Video See-through Augmented Reality System Based on Real-time Vision-based Registration, Kanbara et al., 2000, pp. 1-8.*

Realistic Occlusion Effects in Mirror-Based Co-Located Augmented Reality Systems, Mulder, 2005, pp. 1-7.*

Model-Based Hand Tracking Using a Hierarchical Bayesian Filter, Stenger et al., 2006, pp. 1-13.*

Support System for Guitar Playing using Augmented Reality Display, Motokawa et al., 2006, pp. 1-2.*

* cited by examiner

IMAGE PROCESSING APPARATUS AND IMAGE PROCESSING METHOD

BACKGROUND OF THE INVENTION

1. Field of the Invention

The present invention relates to a technique for presenting a mixed reality space obtained by compositing a physical space and virtual space.

2. Description of the Related Art

Conventionally, a mixed reality (MR) presentation system is available. This system superposes and displays a video image of a physical world and that based on a three-dimensional (3D)-modeled CG, and presents as if an object (virtual object) rendered by a CG were existing on the physical world.

This system comprises a physical video capturing unit which captures a video image of the physical world, a CG video generation unit which generates a CG video image viewed from the position and orientation of the physical video capturing unit, and a video display unit which composites and displays these video images. Furthermore, this system comprises a viewpoint position and orientation detection unit (for example, a position and orientation sensor) which detects the position and orientation of the viewpoint of the physical video capturing unit, so as to correctly display the positional relationship between the CG video image and the video image of the physical world even when the position and orientation of the viewpoint of the physical video capturing unit have changed.

The physical video capturing unit, which captures a video image of a physical space, comprises, e.g., a video camera. The physical video capturing unit captures a video image of the physical world in the line of sight direction of itself, and stores the captured video image of the physical world in a memory.

The CG video generation unit lays out a 3D-modeled CG on a virtual space having the same scale as the physical world, and renders a virtual scene as that observed from the position and orientation of the viewpoint detected by the viewpoint position and orientation detection unit.

Upon compositing the CG video image generated in this way and the video image of the physical world captured by the physical video capturing unit, a video image can be consequently displayed so that an observer can observe a CG image laid out on the physical world independently of the position and orientation of the viewpoint. Loading of CG data, a change of a CG layout, animation, and the like can be implemented using the same method as a conventional CG display system.

In order to designate the CG layout position, an additional position and orientation sensor is used, and a CG image can be rendered at a position and orientation indicated by the measurement values of the position and orientation sensor. With this arrangement, the user holds the position and orientation sensor by the hand, and can observe a CG image displayed at the position and orientation designated by the position and orientation sensor, as is conventionally done.

As a video display device which composites and displays a video image of the physical world and a CG video image, for example, an HMD (Head Mounted Display) is used. By using the HMD in place of a normal monitor, and mounting the video camera in the line of sight direction of the HMD, a video image in a direction in which an observer faces can be displayed on the HMD, and a CG video image when the observer faces that direction can be rendered, thus enhancing observer's sense of immersion.

A video display device in an MR presentation system displays, on the aforementioned video display device, an image (MR image) obtained by compositing a video image of the physical world and a CG video image. Note that the video display device may be an HMD called an optical see-through type, which allows an observer to see through a state in front of him or her. In this case, the aforementioned physical video capturing unit optically displays a scenery in front of the HMD intact on a display device without capturing a video image. With the HMD of this type, the observer can directly see through a scenery in front of him or her without any digital processing, and a CG image can be further displayed on that screen.

As the viewpoint position and orientation detection unit, for example, a magnetic position and orientation sensor or the like is used. By attaching such position and orientation sensor to the video camera as the physical video capturing unit (or the HMD to which the video camera is attached), the position and orientation of the viewpoint can be detected. The magnetic position and orientation sensor is a device which detects a relative position and orientation between a magnetism generation device (transmitter) and magnetic sensor (receiver), and detects a 3D position (X, Y, Z) and orientation (Roll, Pitch, Yaw) of the receiver in real time.

With the above arrangement, the observer can observe an MR image obtained by compositing a video image of the physical world and a CG video image via the video display device such as the HMD or the like. When the observer looks around, the physical video capturing unit (video camera) equipped on the HMD captures a video image of the physical world, and the viewpoint position and orientation detection unit (position and orientation sensor) equipped on the HMD detects the position and line of sight direction of the video camera. Then, the CG video generation unit renders a CG video image viewed from the video camera, and composites that image on the video image of the physical world, thereby displaying a composite image.

In the MR presentation system, a CG image can be superposed on a physical object. For example, in a game disclosed in patent reference 1 indicated below, by superposing and displaying a 3D CG image such as a sword, weapon, or the like on an interactive operation input device held by the user, the user can freely manipulate a virtual object (the sword or weapon in this case).

In a conventional, general MR presentation method, a CG video image is merely composited on a video image of the physical world by superposition, and the depth ordering between a physically existing object and CG image is often not considered. For this reason, even when the observer puts his or her hand in front of a CG image, he or she cannot see his or her hand, and the CG image behind the hand is displayed as if that CG image were located in front of the hand.

FIG. 2A is a view showing an observer who wears an HMD on the head, and a virtual object observed by this observer. In FIG. 2A, an observer 200 wears an HMD 201 on the head, and observes a virtual object 202 while bringing his or her hand 203 into self view.

FIG. 2B is a view showing an example of an image displayed on the HMD 201 when the observer 200 observes the virtual object 202 while bringing his or her hand 203 into self view. As shown in FIG. 2B, reference numeral 204 denotes an image displayed on the HMD 201. This image 204 includes that of the hand 203, which is occluded behind the virtual object 202. In FIG. 2B, the occluded hand 203 is indicated by the dotted line.

According to the depth ordering between the virtual object 202 and hand 203, the hand 203 is to be rendered in front of the virtual object 202. However, since a CG video image is composited on a video image of the physical space by superposition, the virtual object 202 is rendered on a region where the hand 203 is to be originally rendered. A physical video image of a wrist part which is not occluded behind the virtual object 202 can be seen, but a finger tip part occluded behind the virtual object 202 cannot be observed.

If depth information of a physical object is measured in real time, the depth ordering between virtual and physical objects can be correctly displayed. However, an apparatus required to measure the depth information of a physical object in real time is bulky and expensive. Furthermore, the contour of overlapping between virtual and physical objects is often not correctly seen due to an insufficient resolution of the depth information.

When the color of a physical object is expected to be a specific color, the following method is often used. That is, a mask image is generated by detecting the specific color on an image, and a CG video image is masked using that mask image, so that no CG video image is rendered on a place where the physical object is to be displayed. For example, when overlapping of a hand poses a problem, a mask image can be generated by detecting a flesh color area in a video image of the physical world. However, in this case, even when a physical object exists behind a virtual object, the physical object may be unwantedly observed in front of the virtual object or all physical objects with the same color may be unwantedly observed in front of the virtual object.

As one of methods of solving such problem of overlapping display between virtual and physical objects, the following method is available. That is, a position and orientation sensor is attached to a physical object (e.g., own hand), and a virtual object that simulates the shape of the physical object is laid out in correspondence with the position and orientation measured by that position and orientation sensor, so that the physical object and virtual object overlap each other. The depth ordering of the respective virtual objects is correctly displayed, since both objects are CG images. Since the shapes of the physical and virtual objects and their positional relationship do not perfectly match, the physical and virtual objects are displayed not to perfectly overlap each other (seen to deviate from each other), but the virtual object is displayed at basically the position of the physical object to have a correct depth ordering.

Using such arrangement, when the observer puts his or her hand 203 in front of the virtual object 202, as shown in FIG. 2A, an image, in which a virtual object 206 that simulates the hand 203 is laid out at the position of the hand 203, as shown in FIG. 2C, is displayed on the HMD 201 becomes an image. That virtual object 206 is located in front of the virtual object 202. The position and orientation of the virtual object 206 change based on the measurement values of the position and orientation sensor attached to the hand of the observer 200. FIG. 2C is a view showing an example of the image in which the virtual object 206 that simulates the hand 203 is laid out at the position of the hand 203.

[Patent Reference 1] Japanese Patent Laid-Open No. 2000-353248

The conventional system, in which a virtual object is overlaid on a physical object, suffers the following problem. That is, when a virtual object that simulates a physical object (the virtual object 206 in FIG. 2C) and another virtual object (the virtual object 202 in FIG. 2C) do not overlap each other when viewed from the observer, the deviations between the positions and shapes of the physical object and the virtual object that simulates the physical object stand out. As a result, the observer may feel unnatural in terms of their appearance.

FIG. 3 is a view showing an example of an image displayed on the HMD when the observer moves the hand 203 to the right from the state of the image shown in FIG. 2C. Due to the measurement errors of the position and orientation of the hand 203, the hand 203 of the observer and the virtual object 206 that simulates the hand 203 are displayed on the HMD to deviate from each other, as shown in FIG. 3. Reference numeral 207 denotes an image displayed on the HMD. In this image 207, the hand 203 of the observer and the virtual object 202 are displayed, and the virtual object 206 that simulates the hand 203 is displayed to deviate from the hand 203.

Due to a difference between the shapes of the physical hand 203 and the virtual object 206 of the hand, the physical hand 203 may be seen to run off the virtual object 206 of the hand, resulting in odd feeling.

SUMMARY OF THE INVENTION

The present invention has been made in consideration of the aforementioned problems, and has as its object to provide a technique that implements preferred overlapping display upon displaying a virtual object that simulates a physical object to overlap that physical object.

According to one aspect of the present invention, there is provided an image processing apparatus having a generation unit which generates an image of a virtual space based on a position and orientation of a viewpoint of an observer, comprising:

a unit which acquires position and orientation information of a specific part of the observer;

a determination unit which determines, when an image of a virtual space after a specific part virtual object that simulates the specific part is laid out according to the position and orientation information on a virtual space on which at least one virtual object is laid out is generated, whether or not a region of the specific part virtual object and a region of another virtual object other than the specific part virtual object overlap each other on the image; and a control unit which controls the generation unit to generate an image of the virtual space on which the other virtual object and the specific part virtual object are laid out when it is determined that the region of the specific part virtual object and the region of the other virtual object overlap each other, and controls the generation unit to generate an image of the virtual space on which only the other virtual object is laid out when it is determined that the region of the specific part virtual object and the region of the other virtual object do not overlap each other.

According to another aspect of the present invention, there is provided an image processing method to be executed by an image processing apparatus having a generation unit which generates an image of a virtual space based on a position and orientation of a viewpoint of an observer, the method comprising:

a step of acquiring position and orientation information of a specific part of the observer;

a determination step of determining, when an image of a virtual space after a specific part virtual object that simulates the specific part is laid out according to the position and orientation information on a virtual space on which at least one virtual object is laid out is generated, whether or not a region of the specific part virtual object and a region of another virtual object other than the specific part virtual object overlap each other on the image; and a control step of controlling the generation unit to generate an image of the virtual space on which the other virtual object and the specific part virtual object are laid out when it is determined that the region of the specific part virtual object and the region of the other virtual object overlap each other, and controlling the generation unit to generate an image of the virtual space on which only the other virtual object is laid out when it is determined that the region of the specific part virtual object and the region of the other virtual object do not overlap each other.

Further features of the present invention will become apparent from the following description of exemplary embodiments with reference to the attached drawings.

DESCRIPTION OF THE EMBODIMENTS

Preferred embodiments of the present invention will be described in detail hereinafter with reference to the accompanying drawings. Note that these embodiments will be explained as examples of the preferred arrangement of the invention described in the scope of claims, and that invention is not limited to the embodiments to be described hereinafter.

Figure 1:
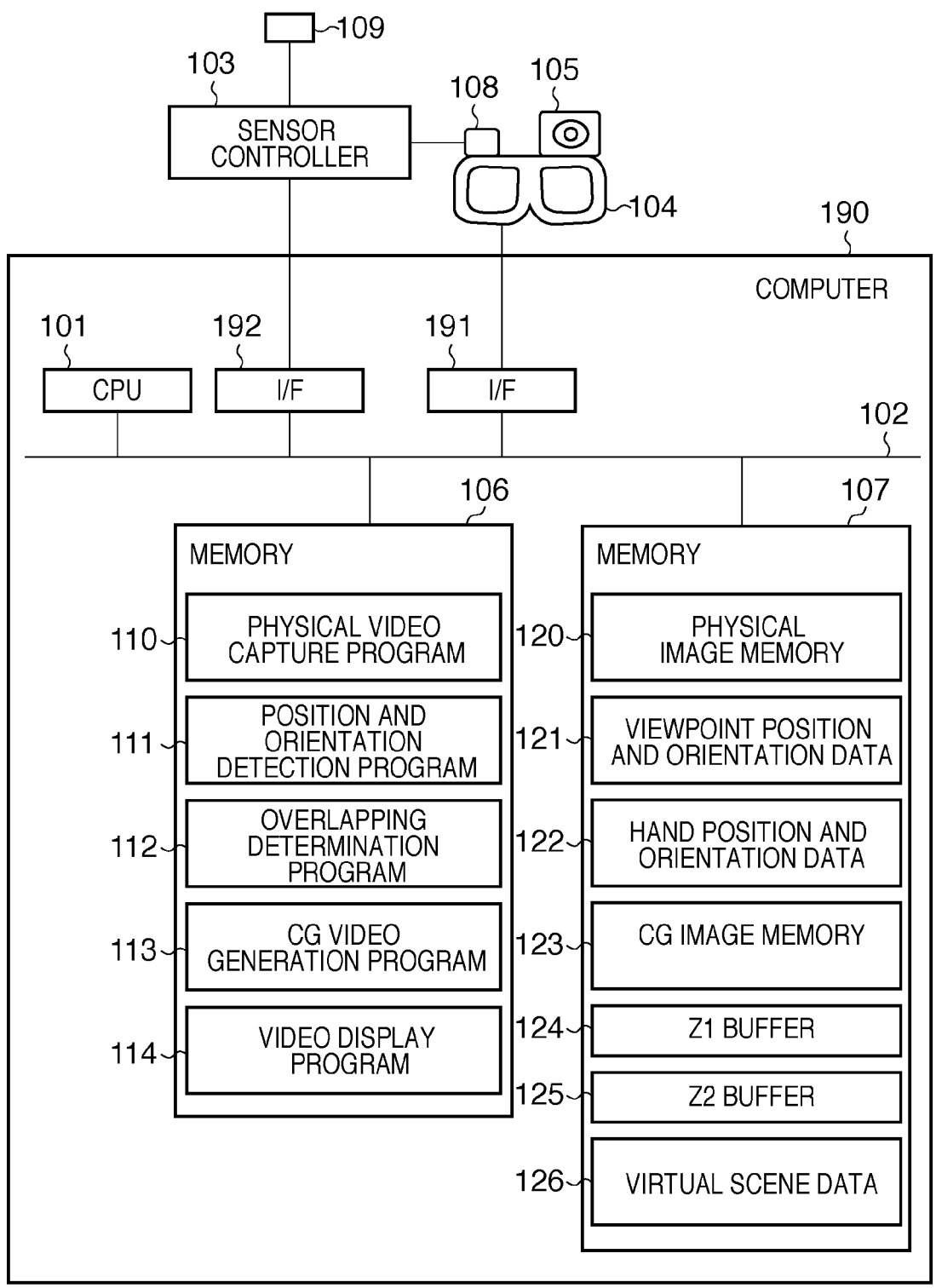
FIG. 1 is a block diagram showing an example of the hardware arrangement of a system according to the first embodiment of the present invention.

FIG. 1 is a block diagram showing an example of the hardware arrangement of a system according to this embodiment. As shown in FIG. 1, the system according to this embodiment comprises an HMD 104, position and orientation sensor 109, sensor controller 103, and computer (image processing apparatus) 190.

The HMD 104 will be described first.

A video camera 105 and position and orientation sensor 108 are attached to the HMD 104.

The video camera 105 is used to capture a movie of a physical space, and images of respective captured frames (physical space images) are transmitted to the subsequent computer 190.

The position and orientation sensor 108 measures the position and orientation of itself, and transmits the measurement results to a sensor controller 103. The sensor controller 103 generates position and orientation information of the position and orientation sensor 108 based on the measurement results of the position and orientation sensor 108, and transmits the generated information to the subsequent computer 190. Note that various sensor systems can be used for the position and orientation sensor 108 and sensor controller 103. For example, when a magnetic sensor system is used, the position and orientation sensor 108 and sensor controller 103 operate as follows.

At a predetermined position on the physical space, a transmitter drive-controlled by the sensor controller 103 is arranged. The transmitter generates a magnetic field around it under the drive control of the sensor controller 103. The position and orientation sensor 108 detects a change in magnetic field according to the position and orientation of itself, and transmits the detection results to the sensor controller 103. The sensor controller 103 calculates position and orientation information of the position and orientation sensor 108 on a sensor coordinate system based on the detection results transmitted from the position and orientation sensor 108. Note that the sensor coordinate system is a coordinate system which has the position of the transmitter as an origin, and has three axes orthogonal to each other at that origin as x-, y-, and z-axes. The sensor controller 103 transmits the calculated position and orientation information to the computer 190.

Any methods may be used as long as the position and orientation information of the position and orientation sensor 108 can be calculated. Since the position and orientation information of the video camera 105 is to be finally calculated, the position and orientation sensor 108 may be omitted if the position and orientation information of the video camera 105 can be directly calculated. For example, a known method of calculating the position and orientation information of the video camera 105 using an image captured by the video camera 105 may be used.

The position and orientation sensor 109 will be described below.

The position and orientation sensor 109 is attached to a specific part (a hand in this embodiment) of an observer to measure the position and orientation of the specific part, and operates in the same manner as the position and orientation sensor 108. That is, the position and orientation sensor 109 measures the position and orientation of itself (those of the hand), and transmits the measurement results to the sensor controller 103. The sensor controller 103 generates position and orientation information of the position and orientation sensor 109 based on the measurement results, and transmits the generated position and orientation information to the computer 190. Therefore, a magnetic sensor or other sensors may be applied to the position and orientation sensor 109 as in the position and orientation sensor 108. In this embodiment, the position and orientation sensors 108 and 109 are included in an identical sensor system, and are respectively connected to the sensor controller 103. However, these sensors may form different sensor systems.

In this embodiment, only one position and orientation sensor 109 is connected to the sensor controller 103 since the position and orientation of one specific part are to be measured. However, upon measuring the positions and orientations of a plurality of parts, position and orientation sensors may respectively attached to parts, the positions and orientations which are to be measured, and may be connected to the sensor controller 103. In this case, the sensor controller 103 generates position and orientation information of the respective position and orientation sensors, and transmits the generated information to the computer 190. Of course, an acquisition method of position and orientation information of a plurality of parts is not particularly limited.

The computer 190 will be described below. The computer 190 has a CPU 101, memories 106 and 107, and I/Fs (interfaces) 191 and 192, which are connected to a bus 102. Note that FIG. 1 shows only principal components of the computer 190, and does not show all components of the computer 190.

The CPU 101 executes respective processes to be described later as those to be implemented by the computer 190 using various data stored in the memory 107 and various programs stored in the memory 106. The CPU 101 outputs data to the memory 107 as needed during execution of the processes.

The memory 106 stores programs 110 to 114 to be described later. Assume that the memory 106 also stores various other programs used by the computer 190 in the processes to be described later as those to be implemented by the computer 190 in addition to the programs 110 to 114.

The memory 107 stores viewpoint position and orientation data 121 as position and orientation information of a viewpoint of the observer who wears the HMD 104 on the head, hand position and orientation data 122 as position and orientation information of the hand of the observer, and virtual scene data 126 as data that configure a virtual space. The virtual scene data 126 will be described in detail later. Furthermore, the memory 107 is allocated with four storage areas, i.e., a physical image memory 120, CG image memory 123, Z1 buffer 124 (first memory), and Z2 memory 125 (second memory). Assume that the memory 107 also stores various other data used by the computer 190 in the processes to be described later as those to be implemented by the computer 190 in addition to the data 121, 122, and 126.

Note that the respective pieces of information described as those held by the memories 106 and 107 need not be held in these memories 106 and 107, as shown in FIG. 1. More specifically, how to store respective pieces of information in any of the memories 106 and 107 is not particularly limited. Also, new storage areas may be set in these memories 106 and 107 as needed. The memories 106 and 107 may be integrated into one memory.

The I/F 191 is used to connect a display unit of the HMD 104 and the video camera 105 to the computer 190. A composite image generated by the processes to be described later by the computer 190 is transmitted to the display unit of the HMD 104 via this I/F 191. Also, physical space images of respective frames captured by the video camera 105 are input to the computer 190 via this I/F 191.

The I/F 192 is used to connect the sensor controller 103 to the computer 190, and position and orientation information calculated by the sensor controller 103 is input to the computer 190 via this I/F 192.

The virtual scene data 126 stored in the memory 107 will be described below. As described above, the virtual scene data 126 are data of various elements that configure the virtual space, and include data of virtual objects and those of light sources.

In this embodiment, assume that the virtual scene data 126 include data of a virtual object that simulates the hand of the observer (hand virtual object), data of one or more other virtual objects (a virtual object to be observed and other virtual objects), and data of light sources to be laid out on the virtual space. The data of each virtual object include normal vector data and color data of polygons, coordinate value data of respective vertices that form polygons when, for example, that virtual object is configured by polygons, and also texture map data when texture mapping is done. Data of each light source include position and orientation data, type data, color data, and the like of that light source.

Figure 5:
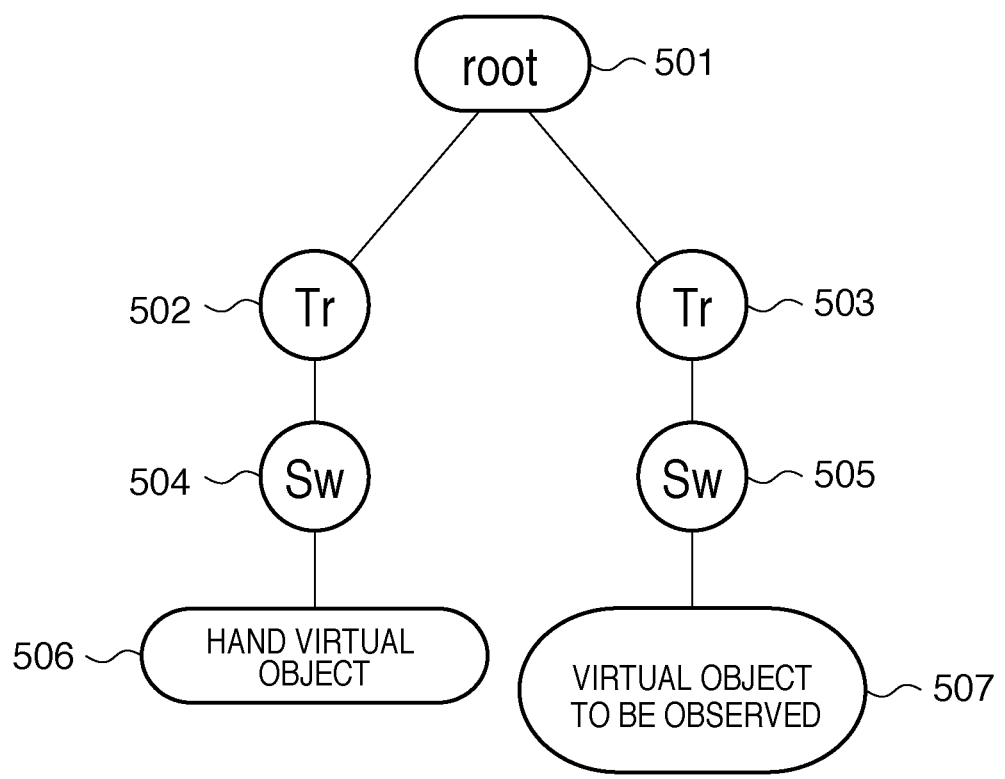
FIG. 5 is a view showing an example of the configuration of a part of a scene graph.

In this embodiment, the virtual space (virtual scene) is managed using a known scene graph. The virtual scene data 126 also include data of that scene graph. FIG. 5 is a view showing an example of the configuration of a part of a scene graph. FIG. 5 shows the management configuration of the hand virtual object and virtual object to be observed. That is, the scene graph normally includes nodes of light sources and the like in addition to the configuration shown in FIG. 5. FIG. 5 illustrates only the configuration required in the following description, and other configurations are omitted.

Referring to FIG. 5, reference numeral 501 denotes a root node. Under the root node 501, the hand virtual object and virtual object to be observed are managed. In FIG. 5, reference numeral 502, 504, and 506 denote nodes associated with the hand virtual object; and 503, 505, and 507, nodes associated with the virtual object to be observed.

The node 502 indicates the position and orientation of the hand virtual object. The node 503 indicates the position and orientation of the virtual object to be observed. The node 504 indicates whether or not to display the hand virtual object (whether or not to lay it out on the virtual space). The node 505 indicates whether or not to display the virtual object to be displayed (whether or not to lay it out on the virtual space). The node 506 is associated with geometry information and material information of the hand virtual object (data of the hand virtual object). The node 507 is associated with geometry information and material information of the virtual object to be observed (data of the virtual object to be observed).

In this way, the hand virtual object and virtual object to be observed are managed by the scene graph.

Figure 4:
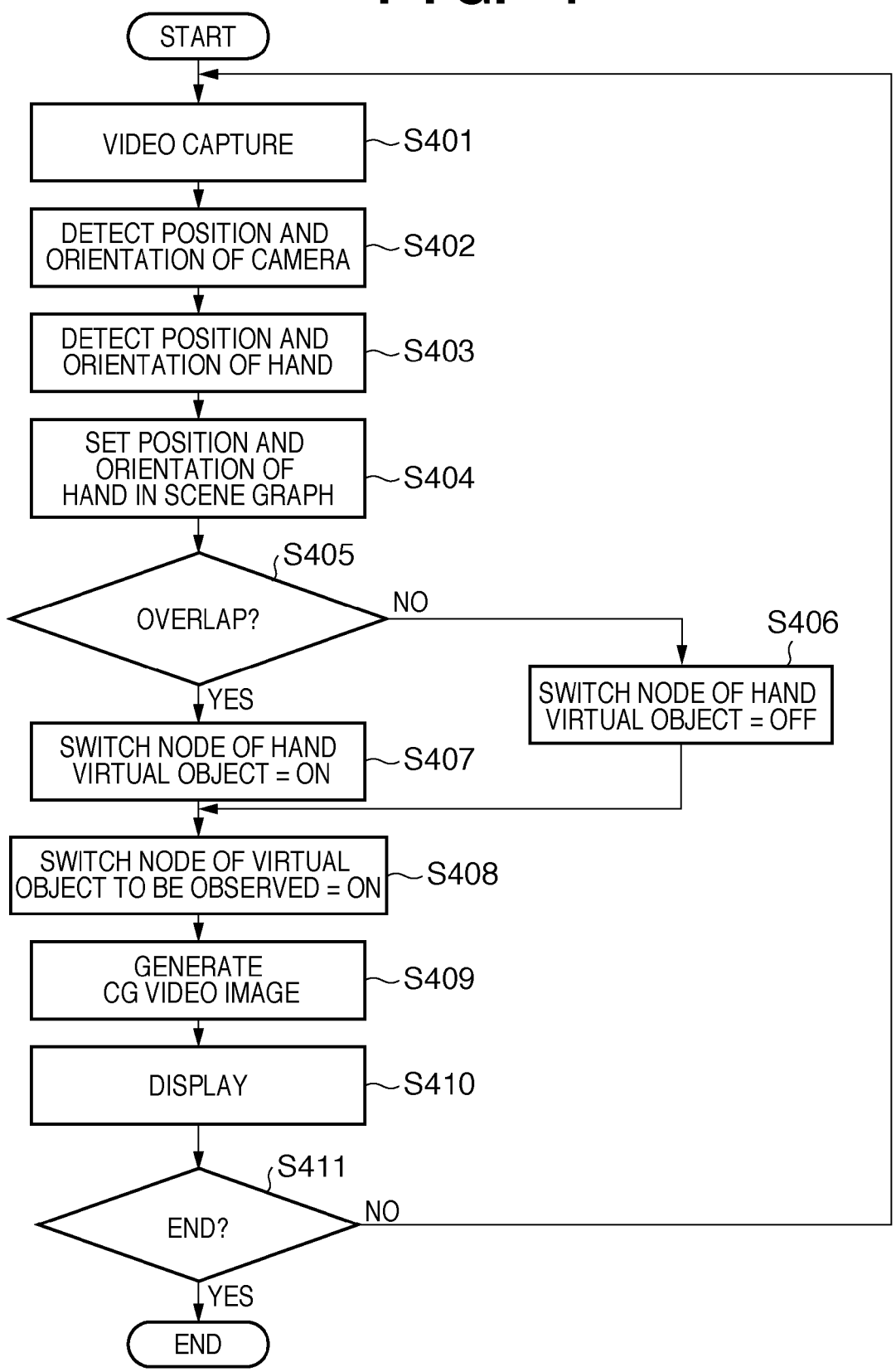
FIG. 4 is a flowchart showing a series of processes to be executed by a computer 190 to generate a composite image of virtual and physical space images, and to output that image to an HMD 104.

A series of processes to be executed by the computer 190 to generate a composite image of virtual and physical space images, and to transmit it to the HMD 104 will be described below with reference to FIG. 4 which shows the flowchart of these processes. Note that programs and data which make the CPU 101 execute the processes according to the flowchart of FIG. 4 are stored in the memories 106 and 107. Therefore, when the CPU 101 executes processes using these programs and data, the computer 190 implements those according to the flowchart of FIG. 4.

In step S401, the CPU 101 executes the physical video capture program 110. As a result of execution of the physical video capture program 110, the CPU 101 stores data of physical space images input from the video camera 105 to the computer 190 via the I/F 191 in the physical image memory 120 in the memory 107.

In step S402, the CPU 101 executes the position and orientation detection program 111. As a result of execution of the position and orientation detection program 111, the CPU 101 acquires position and orientation information of the position and orientation sensor 108 transmitted from the sensor controller 103. The CPU 101 calculates position and orientation information of the video camera 105 (viewpoint) by adding position and orientation relationship information indicating the position and orientation relationship between the video camera 105 and position and orientation sensor 108 to the acquired position and orientation information. The CPU 101 calculates that position and orientation relationship information in advance, and stores it in the memory 107. The CPU 101 stores the position and orientation information of the viewpoint calculated in this way in the memory 107 as the viewpoint position and orientation data 121.

In step S403, the CPU 101 executes the position and orientation detection program 111. As a result of execution of the position and orientation detection program 111, the CPU 101 acquires position and orientation information of the position and orientation sensor 109 transmitted from the sensor controller 103, and stores the acquired information in the memory 107 as the hand position and orientation data 122.

In step S404, the CPU 101 sets the position and orientation information of the position and orientation sensor 109 acquired in step S403 in the scene graph as the position and orientation information of the hand. In case of FIG. 5, the CPU 101 sets the position and orientation information acquired in step S403 in the node 502.

In step S405, the CPU 101 executes the overlapping determination program 112. As a result, upon generation of an image of the virtual space which is viewed from the viewpoint having the position and orientation indicated by the viewpoint position and orientation data 121 and on which the hand virtual object and virtual object to be observed are laid out, the CPU 101 checks if a region of the hand virtual object and that of the virtual object to be observed overlap each other on that image. Details of the process in step S405 will be described later using FIG. 6.

As a result of checking in step S405, if the CPU 101 determines that the objects overlap each other, the process advances to step S407; otherwise, the process advances to step S406.

In step S407, the CPU 101 determines that the hand virtual object is laid out on the virtual space. In FIG. 5, the CPU 101 sets "ON" in the node 504 for the hand virtual object.

On the other hand, in step S406 the CPU 101 determines that the hand virtual object is inhibited from being laid out on the virtual space. In FIG. 5, the CPU 101 sets "OFF" in the node 504 for the hand virtual object.

In step S408, the CPU 101 determines that the virtual object to be observed is laid out on the virtual space. In FIG. 5, the CPU 101 sets "ON" in the node 505 for the virtual object to be observed. Note that the CPU 101 may skip the checking process as to whether or not to lay out the virtual object to be observed, and may always determine that it is laid out.

In step S409, the CPU 101 executes the CG video generation program 113. As a result of execution of the CG video generation program 113, the CPU 101 generates an image of the virtual space (virtual space image) that can be seen from the viewpoint having the position and orientation indicated by the viewpoint position and orientation data 121 acquired in step S402. On this virtual space, one or more virtual objects to be observed are laid out. Furthermore, when the node 504 for the hand virtual object is set "ON", the hand virtual object is laid out on that virtual space. On the other hand, when the node 504 for the hand virtual object is set "OFF", no hand virtual object is laid out on the virtual space. In this manner, the virtual space is built based on the virtual scene data 126.

The CPU 101 temporarily stores the generated virtual space image in the CG image memory 123 in the memory 107. After that, the CPU 101 generates a composite image of the physical space image stored in the physical image memory 120 and the virtual space image stored in the CG image memory 123. Note that various conventional techniques of generating a composite image of the physical and virtual space images have been proposed, and this embodiment may use any of these methods. Of course, the arrangement of the computer 190 may be changed as needed according to the technique to be used.

In step S410, the CPU 101 executes the video display program 114. As a result of execution of the video display program 114, the CPU 101 generates a video signal based on data of the composite image generated in step S409, and transmits the video signal to the display unit of the HMD 104 via the I/F 191. In this way, the composite image is displayed in front of the eyes of the observer who wears the HMD 104 on the head.

If the CPU 101 detects that an end instruction of this processing is input via an operation input device (not shown) of the computer 190 or that an end condition of this processing is satisfied, this processing ends via step S411. On the other hand, if the CPU 101 detects neither of them, the process returns to step S401 via step S411, thus repeating the subsequent processes.

Figure 6:
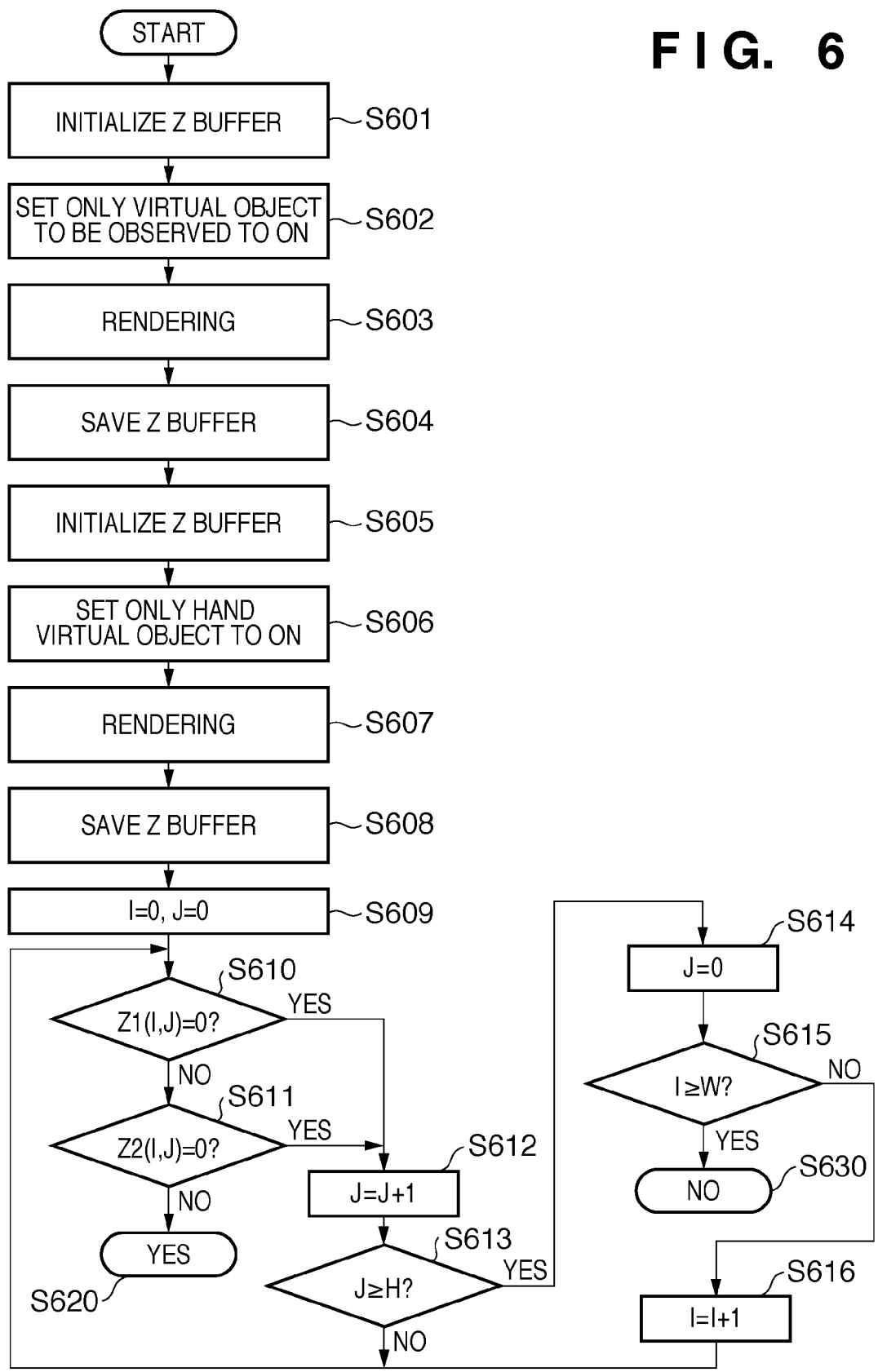
FIG. 6 is a flowchart showing details of overlapping determination processing in step S405.

Details of the process in step S405 will be described below with reference to the flowchart of FIG. 6. FIG. 6 is a flowchart showing details of the overlapping determination process in step S405.

In step S601, the CPU 101 initializes a Z buffer allocated on the memory 107. With this initialization, processing for filling "0" in the Z buffer is executed. Note that the Z buffer is a work buffer used to hold depth information upon CG rendering, as is well known. Note that the Z buffer may be allocated on either of the memories 106 and 107.

In step S602, the CPU 101 manipulates the scene graph to set no laying out of the hand virtual object, and laying out of the virtual object to be observed. That is, in FIG. 5, the CPU 101 sets "OFF" in the node 504 for the hand virtual object, and sets "ON" in the node 505 for the virtual object to be observed.

In step S603, the CPU 101 executes the CG video generation program 113. As a result, the CPU 101 generates a virtual space image based on the virtual scene data 126 as in the virtual space image generation process executed in step S409. Upon generation of the virtual space image in step S603, the virtual object to be observed is laid out on the virtual space, but the hand virtual object is not laid out, as being set in step S602. When the virtual object image is generated in this step, the depth values of respective pixels which form the virtual object to be observed on the generated virtual space image are recorded at the corresponding pixel positions in the Z buffer. That is, the Z buffer records a two-dimensional (2D) data array in which "0" is assigned to pixels which form a region other than that of the virtual object to be observed, and corresponding depth values are assigned to pixels which form the region of the virtual object to be observed.

In step S604, the CPU 101 copies data (2D data array) held by the Z buffer at that time intact to the Z1 buffer 124 in the memory 107 (first unit).

In step S605, the CPU 101 initializes the Z buffer as in step S601.

In step S606, the CPU 101 manipulates the scene graph to set laying out of the hand virtual object, and no laying out of the virtual object to be observed. That is, in FIG. 5, the CPU 101 sets "ON" in the node 504 for the hand virtual object, and "OFF" in the node 505 for the virtual object to be observed.

In step S607, the CPU 101 executes the CG video generation program 113. As a result, the CPU 101 generates a virtual space image based on the virtual scene data 126 as in the virtual space image generation process executed in step S409. Upon generation of the virtual space image in step S607, the hand virtual object is laid out on the virtual space, but the virtual object to be observed is not laid out, as being set in step S606. When the virtual space image is generated in this step, the depth values of respective pixels which form the hand virtual object on the generated virtual space image are recorded at the corresponding pixel positions in the Z buffer. That is, the Z buffer records a 2D data array in which "0" is assigned to pixels that form a region other than that of the hand virtual object, and corresponding depth values are assigned to pixels that form the region of the hand virtual object in the virtual space image.

In step S608, the CPU 101 copies data (2D data array) held by the Z buffer at that time intact to the Z2 buffer 125 in the memory 107 (second unit).

In steps S609 to S616, the CPU 101 checks using the 2D data array copied to the Z1 buffer 124 and that copied to the Z2 buffer 125 whether or not the hand virtual object and virtual object to be observed overlap each other (third unit).

In step S609, the CPU 101 initializes variables I and J used in the subsequent processes both to zero.

The CPU 101 checks in step S610 if the value of an array element Z1(I, J) at a position (I, J) in a 2D data array Z1 in the Z1 buffer 124 is zero. As a result of checking, if that value is not zero (nonzero), i.e., if a depth value is recorded in the array element Z1(I, J), the process advances to step S611. On the other hand, as a result of checking in step S610, if the value is zero, i.e., if no depth value is recorded in the array element Z1(I, J), the process advances to step S612.

The CPU 101 checks in step S611 if the value of an array element Z2(I, J) at a position (I, J) in a 2D data array Z2 in the Z2 buffer 125 is zero. As a result of checking, if that value is not zero, i.e., if a depth value is recorded in the array element Z2(I, J), it can be determined that the hand virtual object and the virtual object to be observed overlap each other at the position (I, J) on the virtual space image. Therefore, the process advances to step S620, and the CPU 101 determines that the objects overlap each other (YES). Then, the process advances to step S407 in FIG. 4. On other hand, as a result of checking in step S611, if the value is zero, i.e., if no depth value is recorded in the array element Z2(I, J), the process advances to step S612.

In step S612, the CPU 101 increments the value of the variable J by one.

The CPU 101 checks in step S613 if the value of the variable J incremented in step S612 becomes equal to or larger than the number H of array elements in the height direction of the 2D data array. As a result of checking, if the value of the variable J incremented in step S612 is less than the number H of array elements in the height direction of the 2D data array, the process advances to step S610. On the other hand, if the value of the variable J incremented in step S612 is equal to or larger than the number H of array elements in the height direction of the 2D data array, the process advances to step S614.

In step S614, the CPU 101 initializes the value of the variable J to zero.

The CPU 101 checks in step S615 if the current value of the variable I becomes equal to or larger than the number W of array elements in the width direction of the 2D data array. As a result of checking, if the current value of the variable I is less than the number W of array elements in the width direction of the 2D data array, the process advances to step S616.

In step S616, the CPU 101 increments the value of the variable I by one, and the process then returns to step S610.

On the other hand, as a result of the checking process in step S615, if the current value of the variable I becomes equal to or larger than the number W of array elements in the width direction of the 2D data array, it can be determined that the hand virtual object and the virtual object to be observed do not overlap each other at respective pixel positions on the virtual space image. Therefore, the process advances to step S630, and the CPU 101 determines that the objects do not overlap each other (NO). The process then advances to step S406 in FIG. 4.

In the flowchart of FIG. 6, whether or not the hand virtual object and the virtual object to be observed overlap each other on the virtual space image is determined. However, step S611 may be deleted, and the CPU 101 may check in step S610 if the array elements Z2(I, J) and Z1(I, J) satisfy Z2(I, J)>Z1(I, J).

If Z2(I, J)>Z1(I, J) in step S610, the process advances to step S612; if Z2(I, J)<Z1(I, J) (if the value of Z2(I, J) is equal to or smaller than that of Z1(I, J)), the process advances to step S620.

With the above checking process, even when the hand virtual object and the virtual object to be observed have a positional relationship in which they seem to overlap each other, if the hand virtual object is located behind the virtual object to be observed, it is determined that the objects do not overlap each other, and only when the hand virtual object is located in front of the virtual object to be observed, it is determined that the objects overlap each other.

As the processing for controlling ON/OFF of rendering of the hand virtual object based on the occlusion relationship between the hand virtual object and the virtual object to be observed on the virtual space image, various methods are available. The point of such method is as follows.

That is, when an image of a virtual space after a specific part virtual object that simulates a specific part is laid out on the virtual space on which one or more virtual objects are laid out is generated, whether or not a region of the specific part virtual object and that of each virtual object other than the specific part virtual object overlap each other on this image is checked. If it is determined that the objects overlap each other, the generation process of a virtual space image is controlled to generate an image of the virtual space after the specific part virtual object is laid out on the virtual space on which one or more virtual objects are laid out. On the other hand, if it is determined that the objects do not overlap each other, the generation process of a virtual space image is controlled to generate an image of the virtual space on which one or more virtual objects are laid out but no specific part virtual object is laid out.

Figure 2A:
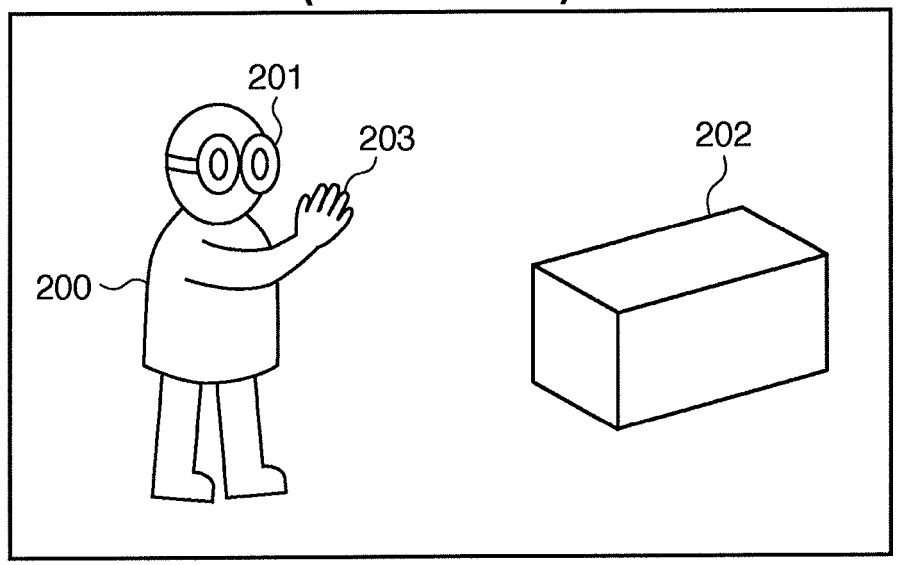
FIG. 2A is a view showing an observer who wears an HMD on the head, and a virtual object observed by this observer.
Figure 2B:
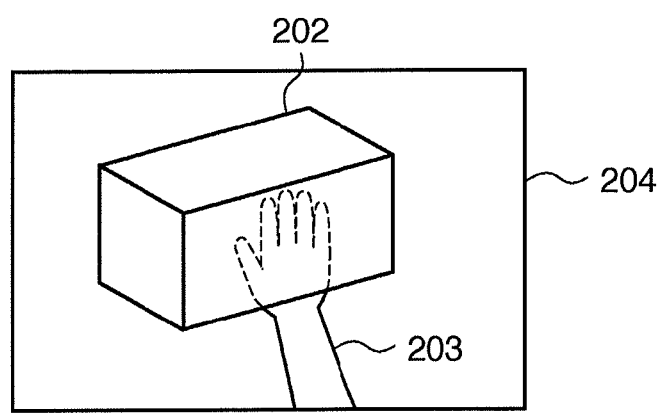
FIG. 2B is a view showing an example of an image displayed on an HMD 201 when an observer 200 observes a virtual object 202 while bringing his or her hand 203 in self view.
Figure 2C:
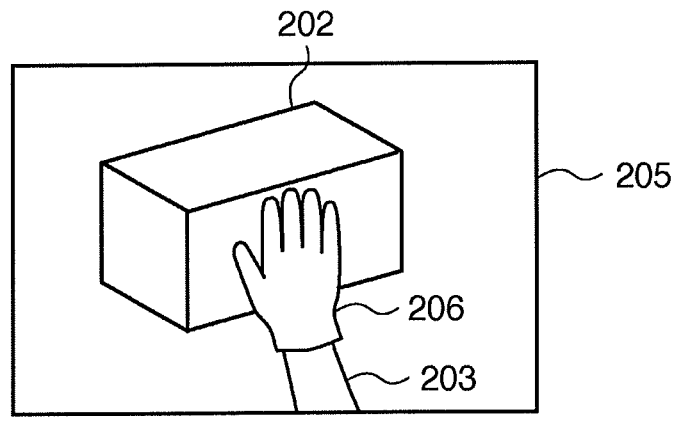
FIG. 2C is a view showing an example of an image in which a virtual object 206 that simulates the hand 203 is laid out at a position of the hand 203.
Figure 3:
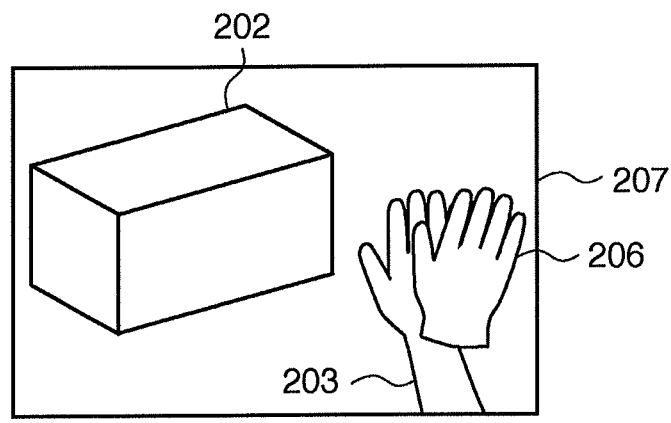
FIG. 3 is a view showing an example of an image displayed on the HMD when the observer moves the hand 203 to the right from the state of the image shown in FIG. 2C.

As described above, according to this embodiment, whether or not the hand of the observer overlaps the virtual object to be observed is determined by checking by approximation whether or not the hand virtual object laid out at the position and orientation of the hand of the observer, and the virtual object to be observed appear to overlap each other when viewed from the viewpoint of the observer. If the hand of the observer and the virtual object to be observed appear to overlap each other, the hand virtual object is laid out at the position and orientation of the hand of the observer, as shown in FIG. 2C, thereby solving a problem of depth inconsistency between the hand of the observer and the virtual object to be observed. If the hand of the observer and the virtual object to be observed do not appear to overlap each other, no virtual object is laid out so as to prevent unnatural feeling described above using FIG. 3.

In this embodiment, if the hand virtual object and the virtual object to be observed do not overlap each other when viewed from the viewpoint of the observer, the hand virtual object is not displayed from the start. However, the hand virtual object may be displayed irrespective of whether or not the objects overlap each other. However, if the objects do not overlap each other, the transparency of the hand virtual object is increased to obscure the hand virtual object, i.e., so-called transparency control processing of a virtual object is executed. A technique for controlling the transparency of a virtual object is a state-of-the-art technique.

Although the hand virtual object is displayed at a given timing since the objects overlap each other, when the objects cease to overlap at the next timing, the hand virtual object disappears suddenly in this embodiment. Hence, the observer who observes the screen experiences an excessively large visual change. Therefore, when the objects cease to overlap, the transparency of the hand virtual object may be gradually increased in place of suddenly extinguishing the hand virtual object. The same applies to a case in which the objects overlap each other again. In such case, the transparency is decreased gradually.

In this way, a visual change given to the observer who observes the screen can be reduced.

Other Embodiments

The objects of the present invention can also be achieved as follows. That is, a recording medium (or storage medium) which records a program code of software that can implement the functions of the aforementioned embodiments is supplied to a system or apparatus. The recording medium is, of course, a computer-readable recording medium. A computer (or CPU or MPU) of the system or apparatus reads out and executes the program code stored in the recording medium. In this case, the program code itself read out from the recording medium implements the functions of the aforementioned embodiments, and the recording medium that records the program code constitutes the present invention.

When the computer executes the readout program code, an operating system (OS) or the like, which runs on the computer execute some or all of actual processes. The present invention also includes a case in which these processes can implement the functions of the aforementioned embodiments.

Furthermore, assume that the program code read out from the recording medium is written in a memory equipped on a function expansion card or function expansion unit, which is inserted in or connected to the computer. After that, a CPU or the like equipped on the function expansion card or unit executes some or all of actual processes, thereby implementing the functions of the aforementioned embodiments.

When the present invention is applied to the recording medium, that recording medium stores program codes corresponding to the aforementioned flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-297192 filed Nov. 15, 2007, which is hereby incorporated by references herein in its entirety.

What is claimed is:

1. An image processing apparatus comprising:
a processor;
a first acquisition unit which acquires position and orientation information of a viewpoint of an observer;
a second acquisition unit which acquires position and orientation information of a hand of the observer;
a determination unit which determines whether or not a virtual hand, which has the same appearance as the hand of the observer and is to be arranged at the position and orientation of the hand of the observer, overlaps on a virtual object to be observed in a view from the viewpoint of the observer, based on the acquired position and orientation information of the viewpoint of the observer and the acquired position and orientation information of the hand of the observer;
a first rendering unit which renders the virtual object to be observed without rendering the virtual hand on an image of a real space including the hand of the observer, in case it is not determined that the virtual hand overlaps on the virtual object to be observed in the view from the viewpoint of the observer; and
a second rendering unit which renders the virtual object to be observed and the virtual hand on the image of the real space including the hand of the observer in such a way that the virtual hand is visibly placed in front of the virtual object to be observed as if the hand of the observer would be placed in front of the virtual object to be observed, in case it is determined that the virtual hand overlaps on the virtual object to be observed in the view from the viewpoint of the observer;
wherein the determination unit, the first rendering unit and the second rendering unit are implemented by the processor.

2. The apparatus according to claim 1, wherein said determination unit comprises:
a first unit which generates an image of the virtual space on which the virtual object to be observed is laid out without an image of the virtual hand, and records depth values of respective pixels which form the image in a first memory as a two-dimensional data array;
a second unit which generates an image of the virtual space on which the virtual hand is laid out without an image of the virtual object to be observed, and records depth values of respective pixels which form the image in a second memory as a two-dimensional data array; and
a third unit which determines, using the two-dimensional data array recorded in the first memory and the two-dimensional data array recorded in the second memory, whether or not the at least a part of the real object should be placed in front of the region of the virtual object to be observed from the viewpoint of the observer.

3. The apparatus according to claim 2 wherein said first unit records zero as depth values of respective pixels which form a region other than the region of the virtual object to be observed in the image of the virtual space on which only the virtual object to be observed is laid out.

4. The apparatus according to claim 2, wherein said second unit records zero as depth values of respective pixels which form a region other than the region of the virtual hand in the image of the virtual space on which only the virtual hand is laid out.

5. The apparatus according to claim 2 wherein when a value of a nonzero array element in the two-dimensional data array recorded in the first memory is not less than a value of an array element recorded at the same position as the array element in the two-dimensional data array recorded in the second memory, said third unit determines that the at least a part of the real object should be placed in front of the region of the virtual object to be observed from the viewpoint of the observer.

6. The apparatus according to claim 1, wherein the real object is a part of the observer.

7. The apparatus according to claim 1, wherein the position and orientation information of the real object indicates an approximate position and orientation which is measured by a sensor.

8. The apparatus according to claim 1, wherein the position and orientation information of the viewpoint of the observer is an approximate position and orientation which is measured by a sensor.

9. An image processing method comprising:
a first acquisition step of acquiring position and orientation information of a viewpoint of an observer;
a second acquisition step of acquiring position and orientation information of a hand of the observer;
a determination step of determining whether or not a virtual hand, which has the same appearance as the hand of the observer and is to be arranged at the position and orientation of the hand of the observer, overlaps on a virtual object to be observed in a view from the viewpoint of the observer, based on the acquired position and orientation information of the viewpoint of the observer and the acquired position and orientation information of the hand of the observer;

a first rendering the virtual object to be observed without rendering the virtual hand on an image of a real space including the hand of the observer, in case it is not determined that the virtual object to be observed in the view from the viewpoint of the observer; and a second rendering step of rendering the virtual object to be observed and the virtual hand on the image of the real space including the hand of the observer in such a way that the virtual hand is visibly placed in front of the first virtual object to be observed as if the hand of the observer would be placed in front of the virtual object to be observed, in case it is determined that the virtual hand overlaps on the virtual object to be observed in the view from the viewpoint of the observer.

10. A non-transitory computer-readable storage medium storing a program for making a computer function as respective units of an image processing apparatus according to claim 1.

\* \* \* \* \*